April 14, 1970   F. F. WHITE   3,506,142
BUNDLE UNSCRAMBLER FOR BAR FEEDERS
Filed Jan. 22, 1969   8 Sheets-Sheet 1

FIG. I

INVENTOR.
FRANK F. WHITE
BY
McCoy, Greene & Howell
ATTORNEYS

FIG. 3

INVENTOR.
FRANK F. WHITE

April 14, 1970   F. F. WHITE   3,506,142
BUNDLE UNSCRAMBLER FOR BAR FEEDERS
Filed Jan. 22, 1969   8 Sheets-Sheet 4

INVENTOR.
FRANK F. WHITE
BY
McCoy, Greene & Howell
ATTORNEYS

FIG. 5

INVENTOR.
FRANK F. WHITE
BY
McCoy, Greene & Howell
ATTORNEYS

FIG. 6

INVENTOR.
FRANK F. WHITE
BY
McCoy, Greene & Howell
ATTORNEYS

FIG. 7

INVENTOR.
FRANK F. WHITE

April 14, 1970   F. F. WHITE   3,506,142
BUNDLE UNSCRAMBLER FOR BAR FEEDERS
Filed Jan. 22, 1969   8 Sheets-Sheet 8

INVENTOR.
FRANK F. WHITE
BY
McCoy, Greene & Howell

United States Patent Office 3,506,142
Patented Apr. 14, 1970

3,506,142
BUNDLE UNSCRAMBLER FOR BAR FEEDERS
Frank F. White, Shaker Heights, Ohio, assignor to Automation Development Corporation, Mentor, Ohio, a corporation of Ohio
Filed Jan. 22, 1969, Ser. No. 793,005
Int. Cl. B65g 65/02
U.S. Cl. 214—1
21 Claims

ABSTRACT OF THE DISCLOSURE

An unscrambling apparatus for loading bars from a bundle to the storage ramp of a bar feeder comprising a rigid frame having legs spaced apart to receive the bundle, a pair of slings for raising and lowering the bundle to orient the bars, guide plates located above the storage ramp to guide the bars onto the ramp so that they form a single row, means responsive to jamming of the disoriented bars for causing lowering and raising of the bundle until the bars are oriented, and means for lowering the slings in response to movement of a bar on the storage ramp. Means may be provided for engaging the bundle when it is lowered to support it and take the load off the supporting slings while causing additional unscrambling movement of the bars in the bundle.

The present application relates to a bundle loader and unscrambler and more particularly to a process and apparatus for automatically unscrambling bars or tubes being fed from a bundle to the storage ramp of a bar feeder.

Prior to this invention it was customary to load the storage ramp of bar feeders manually, particularly when handling bars of small diameter which tended to become entangled because of jack strawing or bending of the bars or both. Various machines were proposed for feeding bars individually from a stack or bundle to a storage ramp, as disclosed, for example, in U.S. Patents Nos. 3,045,846, 3,055,515 and 3,214,001 but these did not provide a satisfactory solution to the problem and were not used extensively.

The present invention involves a process and apparatus for effecting unscrambling of an unoriented bundle of bars and for delivering them to a storage ramp or the like in parallel side-by-side relationship in a single row. The apparatus includes two or more spaced flexible slings for supporting the bundle having ends supported at one side of the frame and having drums, pulleys, wheels or other stationary or rotating sling supports mounted on the opposite side of the frame to support the slings and provide festoons for supporting the bundle. A bar storage ramp is located adjacent said sling supports, and motor means or other driving means are provided for moving each sling upwardly from its festoon over its associated sling support or wheel to raise the bundle and to cause a bar to move over such sling support to the ramp. The driving means preferably drives the drum or wheel forming each such sling support and preferably can be reversed to raise and lower the bundle. The sling supports are preferably rotatable and mounted on a common shaft with a series of wheels of greater diameter which engage the bars at spaced points to straighten them as they are lifted and fed to the storage ramp.

According to this invention, unscrambling and orienting of the bars in the bundle is effected by repeatedly raising and lowering the bundle to cause relative movement between the bars, and jamming is avoided by performing such operations frequently while the storage ramp is being loaded. The orienting operation is aided by lowering the bundle against transverse supporting members to cause outward movement of the bars. The desired tumbling and feeding action is obtained by lifting the sling essentially from one side only or mainly from said sling supports at one side.

Limit switches are provided for automatically reversing the drive means at the upper and lower limits of travel of the slings and also for reversing the drive means in response to movement of a bar over the sprockets or other sling supports or over the storage ramp before the bundle is fully elevated so that the unscrambling operations are repeatedly performed during loading of the feed ramp. A limit switch may be provided to lower the bundle whenever there is a malfunction or improper feeding to the feed ramp, and such limit switch may be responsive to pressure on the guide plate where such plate is provided over the feed ramp to prevent more than one row of bars on the ramp.

An object of the present invention is to provide a simple reliable process for unscrambling and orienting a bundle of bars being fed to a bar feeder.

A further object of the invention is to provide a bundle feeder and unscrambler which is sufficiently reliable to permit fully automatic feeding to an automatic bar feeder.

A still further object of the invention is to provide a combination bundle feeder and bar feeder with a common automatic control system.

Another object of the invention is to provide an effective bundle unscrambler which does not damage bars or tubes made of aluminum or other soft materials.

Another object is to provide an automatic bundle feeder and unscrambler which is effective for long or short bars of round, triangular, flat, square, hexagonal, channel, L-shaped or T-shaped cross section or complicated regular or irregular cross section.

A still futher object of the invention is to provide a simple reliable bundle feeder and unscrambler which can handle long heavy bundles and can handle bars of both large and small diameter or width and thickness.

These and other objects, uses and advantages of the present invention will become apparent from the following description and claims and from the drawings in which:

Referring more particularly to the drawings in which like parts are identified by the same numerals throughout the several views, FIGURES 1 to 6 show the apparatus of the present invention including the bar and tube feeder A and unscrambler B. The feeder A has a rigid frame F which includes a box beam 1 having a length, which is several times the height of the beam above the floor and preferably at least 4 times said height. Said box beam is circumferentially continuous and may be seamless or may have a welded seam. Vertical steel channels are welded to the box beam to provide front legs 2 and 2a, intermediate legs 3 and 3a, and rear legs 4 and 4a. Each pair of legs is rigidly connected to three parallel horizontal tubular beams 5, 6 and 7 which are welded to the vertical channels. Transverse horizontal beams 8, 9 and 10 are rigidly connected to the vertical legs 2, 3 and 4, respectively, and supported in cantilever fashion by triangular gusset plates 11. Said horizontal beams are in alignment and are welded to a longitudinal horizontal tubular beam 12. A generally trapezoidal ramp guide plate 13 is rigidly connected to each of the beams 8, 9 and 10 and extends vertically therefrom toward the feed ramp. If desired provisions may be made for adjusting the position of each guide plate but this is not essential.

Means may be provided for reinforcing the frame F and for providing supporting means for limit switches and electrical controls. As herein shown a pair of flat side bars 14 and 15 are welded to the legs 2, 3 and 4 in horizontal positions parallel to an upper bar 16, which is welded to the top portion of said legs. The ends of the bars 14, 15 and 16 are rigidly connected by vertical end bars 17. A flat panel plate 18 is welded to the three bars at the front end of the machine to provide a support for a push-button control box 19 which is electrically connected to suitable electric control equipment within a control cabinet 20, which is also rigidly supported by the bars 14 and 15.

The feeder A is quite similar to the feeder disclosed in co-pending application Ser. No. 633,868, filed Apr. 26, 1967, and has a conveyor C constructed substantially like the conveyor disclosed in that application. Said conveyor has front and rear pairs of sprockets 22 and 23 mounted on horizontal shafts 43 and 21 and has a pair of conventional endless roller chains 24 mounted on said sprockets. The lower flights of the chains are supported in a parallel position by a pair of angles 25 which are welded to the top portion of the box beam 1 and extend between the sprockets along the length of the beam. The upper flights of the chains are similarly held in horizontal positions by side rails 26 of T-shaped cross section which also extend from the front sprockets to the rear sprockets. This construction may be substantially like that disclosed in co-pending application Ser. No. 633,868. The rails 26 are welded to the three transverse horizontal beams 7.

Figure 4:
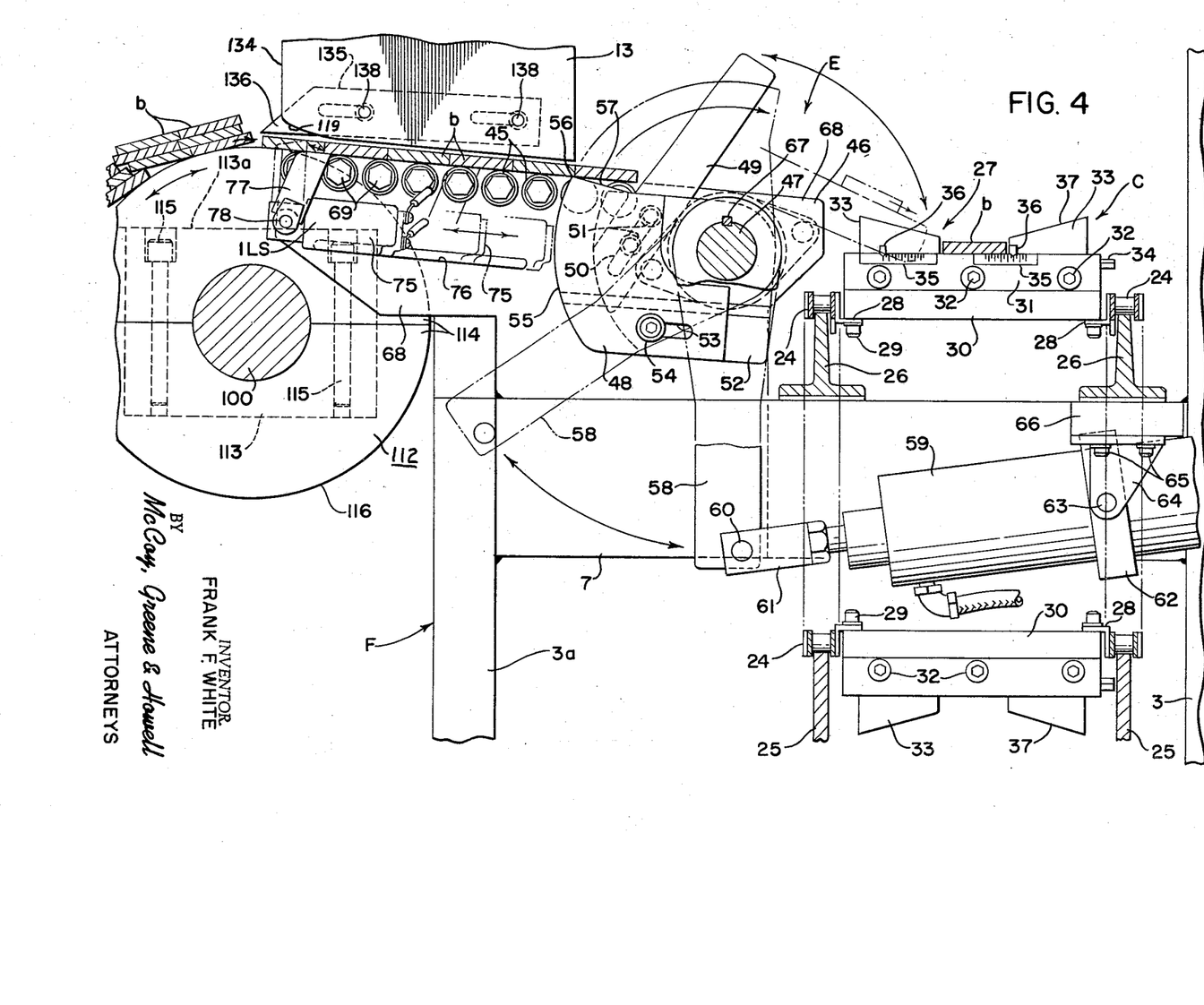
FIGURE 4 is a fragmentary vertical sectional view taken on the line 4—4 of FIGURE 2 and on a larger scale, the escapement arm being shown in dot-dash lines in the advanced position.

A series of adjustable stock carriers 27 are detachably mounted at spaced locations along the length of the chains. These stock carriers may be identical to the stock carriers disclosed in said co-pending application Ser. No. 633,868 but have been modified somewhat, as shown in the drawings, to accommodate flat bar stock. Each carrier is detachably connected to the chain by link supports 28 which serve as links of the chain and by screws 29 which extend through the supports 28 and are screwed into the carrier block 30. Said carrier block extends laterally between the two roller chains as shown in FIGURE 4 and has a pair of removable horizontal slide plates 31 on opposite sides thereof which are held against the vertical faces of the carrier block by clamping screws 32. The slide plates 31 provide ways for a pair of carriage blocks 33 which slide transversely above the carrier block. These carriage blocks are simultaneously moved toward or away from each other by a long adjusting screw 34 whose threads engage threaded portions of the blocks. This is described in more detail in said co-pending application Ser. No. 633,868. Ruled indicator plates 35 and associated pointers 36 are provided on the plate 31 and block 33 as shown in FIGURE 4 to indicate the adjusted positions. The carriage blocks may support a pair of rollers as shown in said co-pending application Ser. No. 633,868 when handling cylindrical bars or tubes. As herein shown said carriage blocks are provided with smooth flat sloping upper surfaces 37 to facilitate sliding of flat bars $b$ to a central position as shown in FIGURE 4.

The conveyor C includes suitable pusher means to advance the bar $b$ in unison with the chains and to feed it axially into the cut-off machine D, lathe, or other machine located at the discharge end of the conveyor. Such pusher means may be of the type disclosed in co-pending application Ser. No. 600,350, filed Nov. 22, 1966, now Patent No. 3,480,159, or said co-pending application Ser. No. 633,868. As herein shown the conveyor C is provided with a pusher block 38, which is rigidly connected between the roller chains 24 so as to move in unison with said chains. A pusher plate 39 is welded to the block 38 and extends longitudinally toward the front of the feeder for engagement with the rear end of a bar $b$ when such bar is in a central feeding position on the carriage 27.

Advancing movement of the pusher and other parts of the conveyor may be effected by a motor 40 which may be an air motor or an electrical motor. Such motor is mounted on a motor bracket 41 carried by the frame and it is operably connected to the drive shaft 43 by a suitable speed reduction means such as a conventional belt-pulley drive means 42.

A series of sloping vertical feed rack plates 68 are welded to the horizontal channels 7 and to the vertical channels 2a, 3a and 4a to reinforce the frame and to provide a storage ramp for supporting a row of bars or tubes for feeding laterally toward the conveyor C. The feed rack plates 68 have straight inclined upper surfaces which are horizontally aligned. Where such surfaces engage the bars they may be formed of a wear-resistant plastic or a soft metal such as brass. However, in the machine shown herein, these surfaces are out of contact with the flat bars $b$. As herein shown, each plate 68 has an end portion 46 which projects inwardly over the top of one of the chains 24 to a position close to the path of movement of the stock carriers 27.

A longitudinal rock shaft 47 extends through the several vertical plates 68 parallel to the box beam 1 and is rotatably supported on said plates by suitable bearings held in place by bearing brackets 44. A series of plates 52 are rigidly mounted at spaced locations along the length of the shaft 47 to provide supports for a series of escapement fingers 48 and a series of rectangular ramp bars 49. Each of said ramp bars has an elongated slot 50 which receives a pair of adjusting screws 51, whereby the ramp bar may be rigidly clamped in a series of adjusted positions on the plate 52. Said plate has internally threaded bores to receive said adjusting screws. Each escapement finger 48 has an elongated slot 53 for receiving an adjusting screw 54 which screws into the plate 52 like the screws 51. Each escapement finger has an arcuate outer surface 55 substantially concentric with the shaft 47 and may be moved toward or away from said shaft to the extent permitted by the slot 53. Each finger 48 has a projecting end portion 56 with an inclined upper surface 57 for engaging the bar $b$ adjacent the bar 49 when the escapement finger is advanced by turning the shaft 47.

A lever arm 58 is rigidly connected to the shaft 47 and is operated by a pneumatic cylinder 59 to effect the desired rocking movement of the shaft 47 and the escapement fingers 48. The piston rod of the cylinder 59 is pivotally connected to the lever 58 by a pivot pin 60 and a bifurcated connecting member 61. The housing of the cylinder 59 is pivotally supported on the frame F by means of a pivoted bracket 62 having a pivot pin 63 supported by L-shaped support members 64 on opposite sides of said bracket. Said support members are rigidly connected by screws 65 to a support block 66 which is rigidly mounted on the bottom of one side rail 26 as shown in FIGURE 4.

The escapement assembly E described above is constructed substantially as disclosed in the aforesaid copending application Ser. No. 633,868 and functions in the same way as will be apparent from the drawings. The shaft 47 is provided with a keyway and a key 67 to permit axial sliding of each plate 52 to the desired adjusted positions.

A row of cylindrical rollers 45 is mounted on each side of each plate 68, and such rollers are mounted in pairs on the opposite end portions of a row of horizontal bolts having hexagonal heads 69 on one side of the plate 69 and hexagonal nuts 70 on the opposite side. The axes of the bolts of each plate 68 are located in a plane parallel to the sloping upper surface of that plate, and the uppermost surfaces of all of the rollers 45 are located substantially in the same inclined plane, which is above the upper surfaces of the plates 68. The rollers 45 are thus located to provide a roller ramp for flat bars $b$ as illustrated in FIGURE 4. Also, because the upper surfaces of the plates 68 are close to the upper surfaces of the rollers, they can assist in supporting round bars when they are mounted on the storage ramp.

A limit switch 1LS is provided at one end of the storage ramp to detect movement of one or more bars $b$ onto the ramp. This switch has a body 75 and is mounted to slide in a slot 76 between different adjusted positions in which it may be locked. The bar-engaging arm or actuator 77 of the switch is mounted on a pivot pin 78 and normally projects above the level of the ramp 68 into the path of movement of the bars $b$ as shown in dot-dash lines in FIGURE 4. As a bar $b$ moves onto the ramp it depresses the actuator 77 to the position shown in solid lines in FIGURE 4 and trips the switch 1LS to initiate lowering of the chains 120 of the unscrambler B. The position of the limit switch relative to the adjusting slot 76 determines the maximum number of bars which may be fed onto the ramp during one cycle of the unscrambler. Such position is usually adjusted when changing from small to large bars and vice versa. Various adjusted positions are illustrated in dot-dash lines in FIGURE 4.

The unscrambler B is preferably provided with a heavy rigid frame and usually designed to carry extremely heavy loads. As each bar $b$ may weigh 300 to 1000 pounds or more, a bundle of solid steel bars may weigh 5 or 10 tons.

As herein shown, the unscrambler has a rigid frame G with three pairs of aligned vertical legs including rear legs 81 and 81$a$, central legs 82 and 82$a$ and front legs 83 and 83$a$ formed of tubular steel. Six tubular steel side braces 84 are welded to the legs near the floor $f$ and three similar lateral tubular braces 85 are welded to the legs and extend between each pair of legs. A longitudinal tubular beam 86 is welded to the top of the leg 81$a$ and to the side of the longer leg 82$a$ in a position parallel to and directly above the underlying brace 84. Two lateral beams 80 are welded to the vertical legs in horizontal positions parallel to and directly above two of the braces 85, one beam 80 extending from the leg 83 to the leg 83$a$ (FIGURE 3) and the other extending from the leg 82 to the leg 82$a$. The legs 82$a$ and 83$a$ may be identical and have upper portions 122, above the level of the beam 86, which are welded to flat top plates 123. The bottoms of all of the six legs of the frame G are welded to rectangular floor plates 87 which are similar to the floor plates 89 of the frame F. The floor plates 87 and 89 are preferably bolted or otherwise rigidly connected to a flat horizontal floor $f$ and the frame G is preferably rigidly connected to the frame F by suitable means, such as a pair of steel angles or connecting brackets 88 welded to the legs 3$a$ and 4$a$ and the adjacent braces 84.

The frame G also has a large flat rigid guide plate 90 with a vertical face in a plane perpendicular to the braces 84 and 86. Said plate is rigidly supported from the rear legs 81 and 81$a$ by two pairs of short tubular supports 91 located directly above and parallel to the rear side braces 84 at opposite sides of the frame G. The plate 90 extends upwardly to the beam 86 and is welded thereto at one side of the frame. At the opposite side of the frame, the plate 90 is preferably cut away so that it can extend under the long main shaft 100.

Driving means for the horizontal shaft 100 are supported on the frame G including an electric drive motor 93 and a speed reduction unit 94 driven by the motor by means of a small pulley 95, a large pulley 96, and a pair of endless V-belts or the like. The frame includes a motor support 98 having support brackets 99 rigidly connected thereto and to the housing of the reduction unit 94. The rotatable shaft 100 is driven by the unit 94 and assists in supporting the drive assembly. Additional support is provided by a long adjustable rod 102, which is rigidly connected to the housing of the unit 94 and to a rigid support bracket 103 carried by the leg 81.

Figure 1:
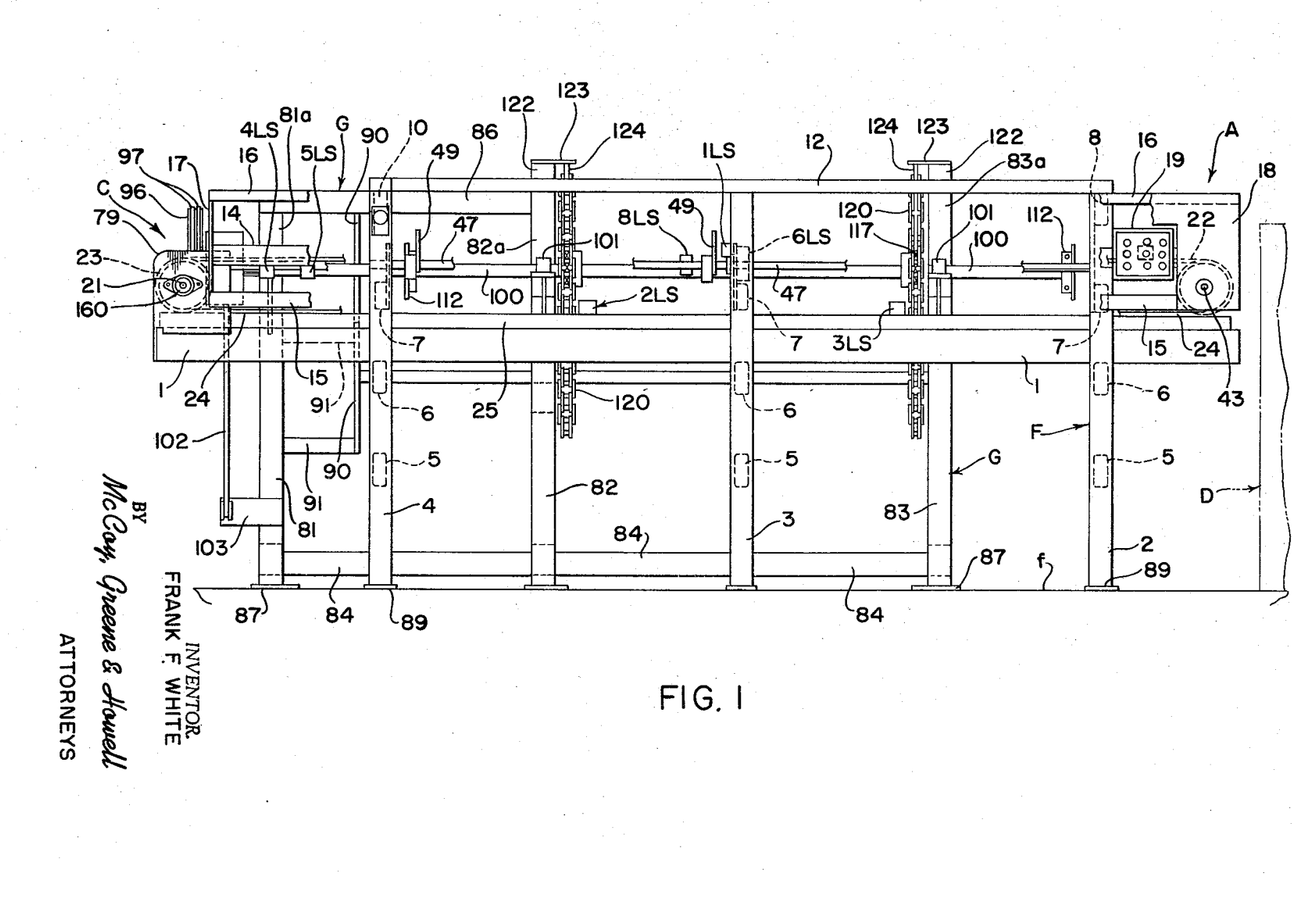
FIGURE 1 is a side elevational view on a reduced scale with parts omitted and parts broken away showing a bar feeding apparatus constructed according to the present invention.
Figure 2:
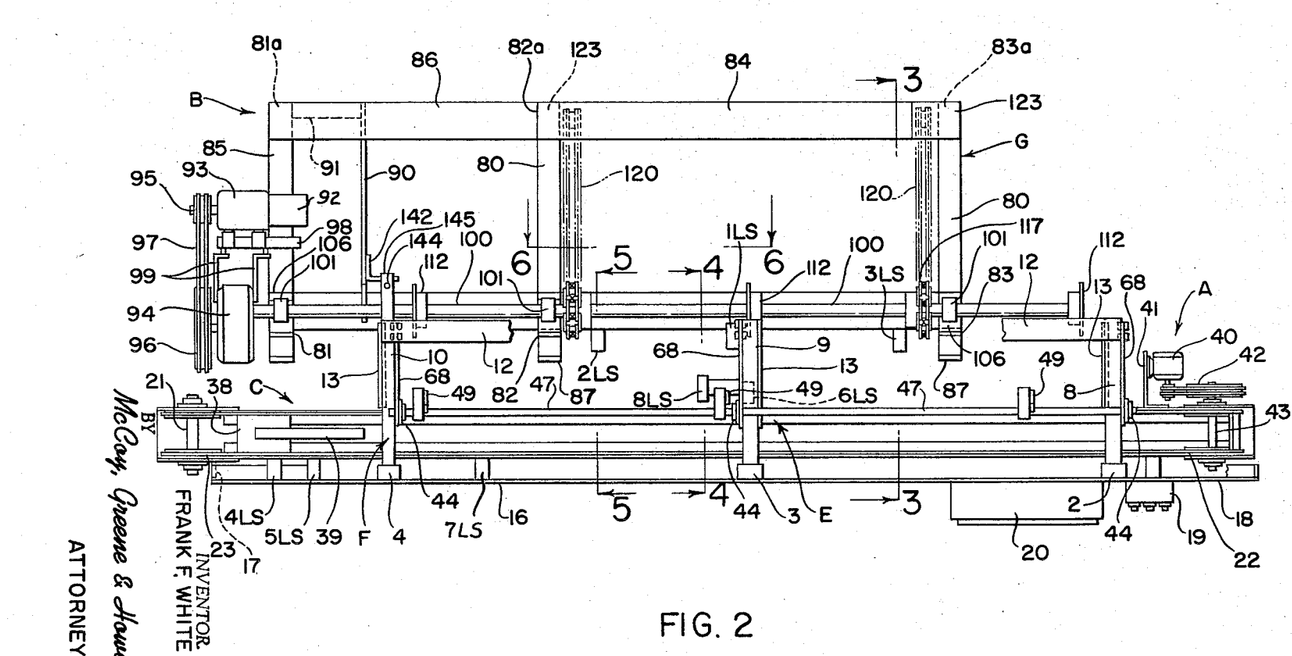
FIGURE 2 is a top plate view of said apparatus on the same scale with parts broken away and parts omitted.
Figure 5:
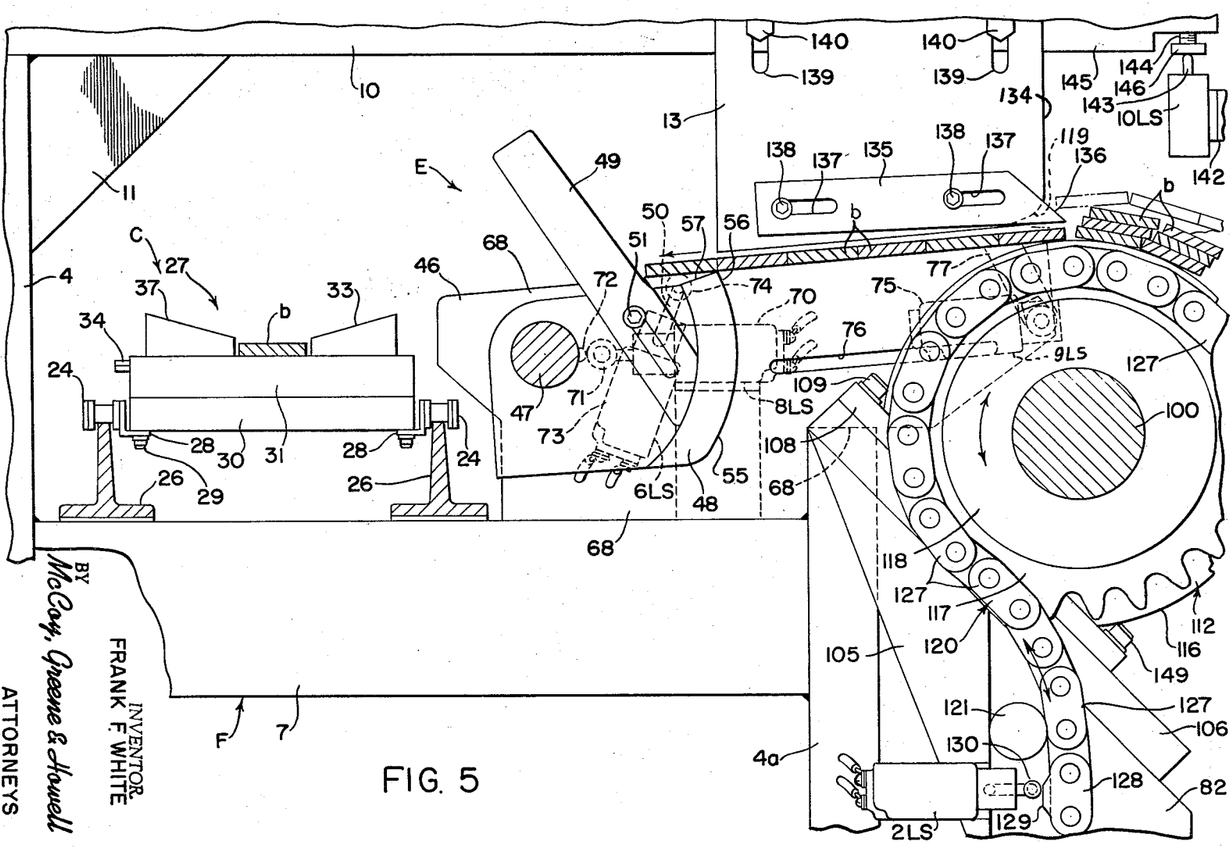
FIGURE 5 is a fragmentary vertical sectional view taken on the line 5—5 of FIGURE 2 and on a larger scale.
Figure 6:
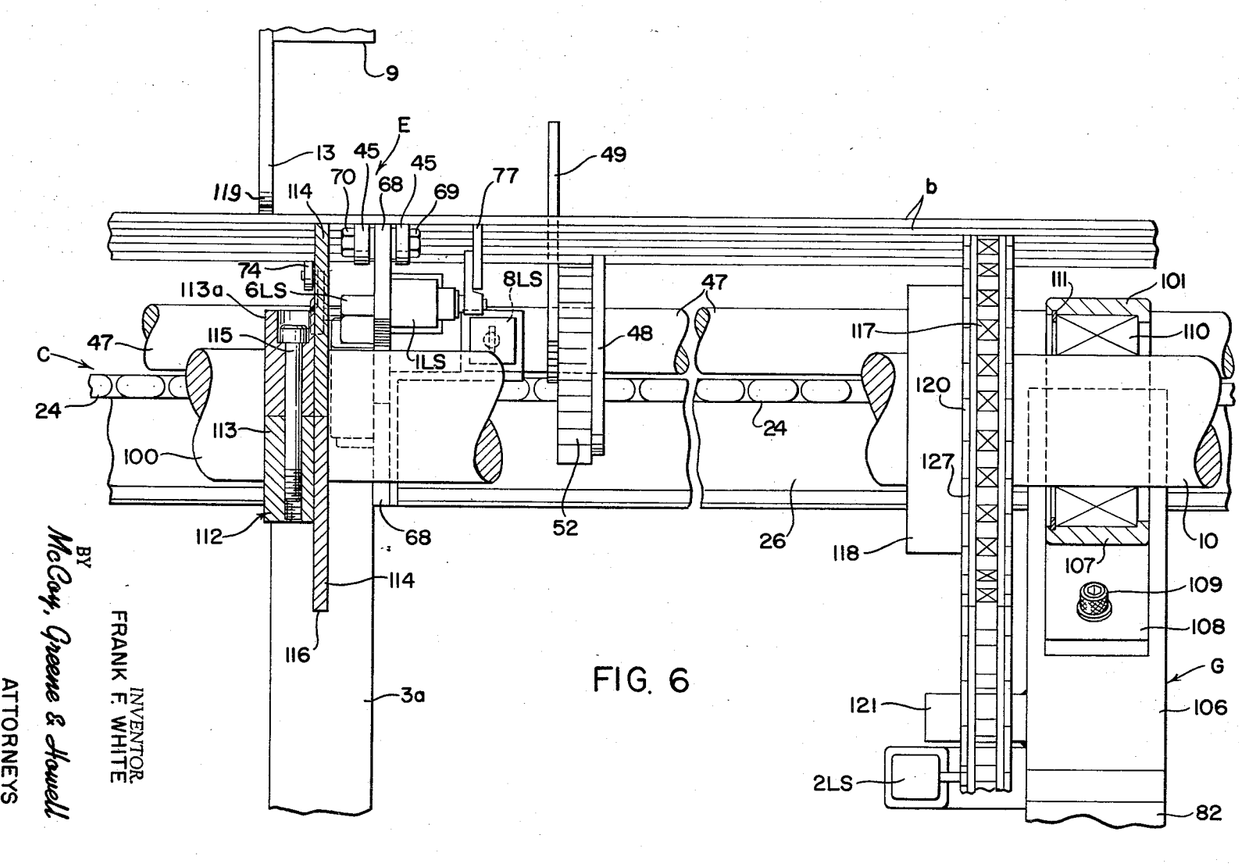
FIGURE 6 is a fragmentary longitudinal vertical sectional view taken on the line 6—6 of FIGURE 2 and on a larger scale.

The horizontal shaft 100 extends longitudinally parallel to the escapement rock shaft 47 and the main beam 1 from the unit 94 to a position near the leg 2$a$ as shown in FIGURE 2. The shaft 100 is rotatably supported above the legs 81, 82 and 83 by suitable roller bearings 101 or the like. Each of these legs may be shaped as shown in FIGURES 5 and 6 to provide support for such bearing means and to permit the desired adjustment or positioning of the main shaft. As herein shown, each leg has a rigid triangular extension 105 and an inclined flat rectangular plate 106 welded thereto. The U-shaped bracket 107 of the bearing 101 has two flanges 108 rigidly mounted on the plate 106 by cap screws 109. The bearing unit 101 may be of conventional construction with the roller bearings 110 held in place by a retaining ring 111.

A series of split circular wheels 112 are mounted in adjusted positions along the length of the main shaft 100 coaxial with said shaft for engagement with the bars $b$ as they are fed to the storage ramp 68. These wheels may be constructed in various ways to permit axial adjustment on the shaft. As herein shown, each wheel is split into two halves of the same size, each having a rectangular hub half 113 or 113$a$ and a flat semi-circular disc half 114 welded thereto. The portions 113 and 113$a$ are rigidly connected and clamped in fixed positions on the shaft 100 by a pair of long screws 115 which extend through the portion 113$a$ and screw into the portion 113 as shown in FIGURE 6. The external cylindrical surface 116 of each wheel 112 is coaxial with the shaft 100 and preferably has a radius somewhat greater than that of the portion of the roller chain 120 resting on its sprocket 117 so as to assist in straightening each bar $b$ just before it moves onto the storage ramp 68 (see FIGURE 4). Where the length of the bars $b$ is changed, it may be desirable to change the axial postion of the wheels 112 and/or the axial position of the sprockets 117 and the escapement members 49. Suitable means may be provided for such axial adjustments, such as the key and keyway at 67 or the split wheel construction at 113.

As herein shown, each of the two sprockets 117 has a cylindrical hub portion 118 which rigidly holds the sprocket on the shaft 110 in a position coaxial therewith and perpendicular to the shaft axis. A pair of roller chains 120 are mounted on the sprockets to provide support for a bundle of bars $b$ above the lateral supports 80, such bundle being shown in dot-dash lines in FIGURE 3. If desired, the chain-and-sprocket arrangement can be replaced by belt-and-pulley arrangement to minimize damage to the bars $b$. For example, the chains 120 can be replaced by nylon belts, woven steel belts described in more detail hereinafter, or plastic-covered steel belts.

Figure 3:
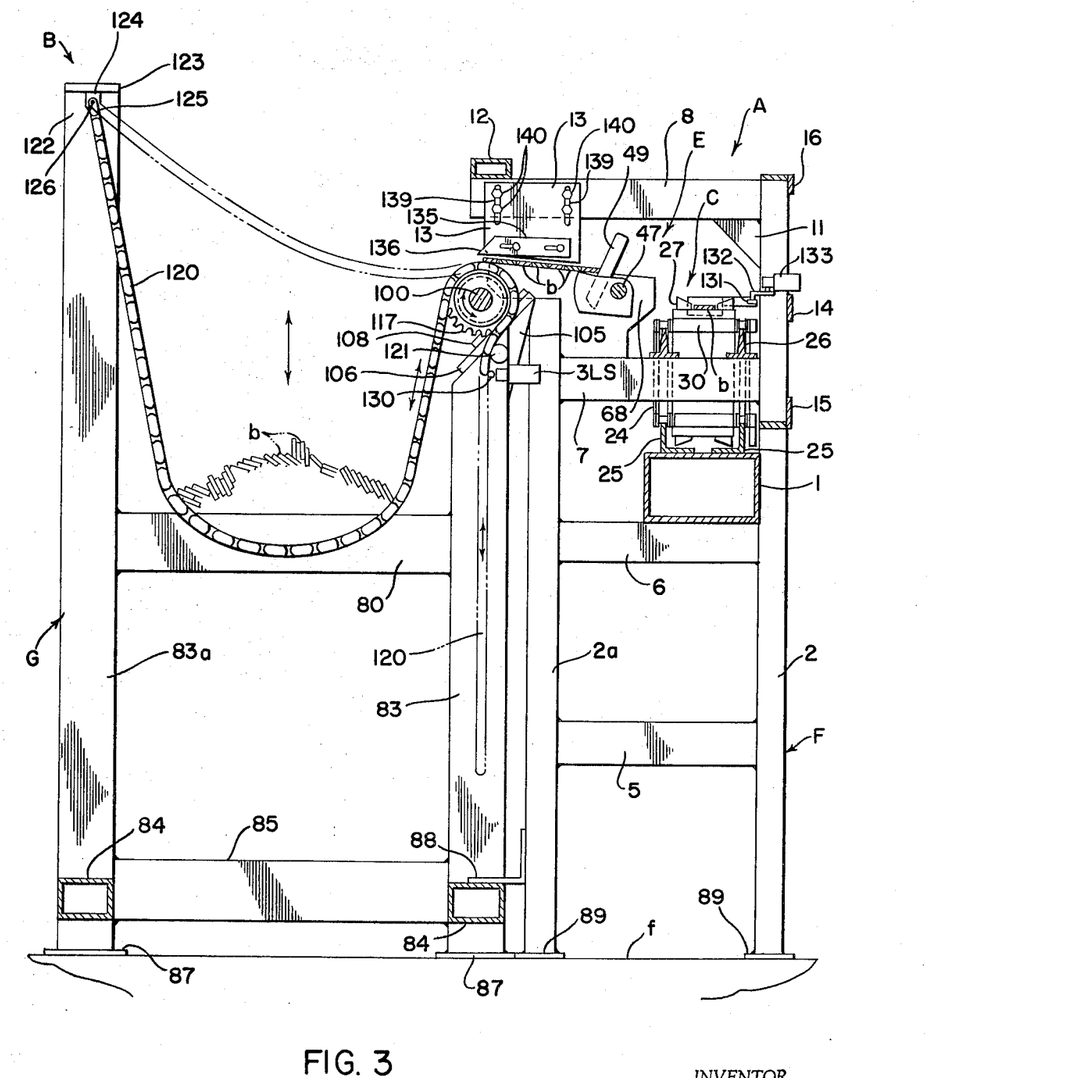
FIGURE 3 is a vertical sectional view of said apparatus taken on the line 3—3 of FIGURE 2 and on a larger scale with parts omitted, the chain slings of the unscrambler being shown in dot-dash lines in an elevated position.

As shown herein, roller chains 120 are provided having end links 125 pivotally connected to rigid vertical lugs 124 of the plates 123 by pins 126 (FIGURE 3). Each chain is festooned between the lug 124 and the sprocket 117 and extends more than 180 degrees around the sprocket and over another sprocket or short cylindrical member 121 which need not be rotatable. As herein shown, the two members 121 are rods welded to the vertical legs 82 and 83 below and near the sprockets 117.

Each roller chain sling 120 may be of conventional construction similar to a bicycle chain with outer links 127 connecting adjacent pins of the chain. As herein shown, two special outer links 128 are provided to replace two of the links 127, each special link having a projecting cam portion 129 for actuating a limit switch 2LS or an identical limit switch 3LS. The cam portion 129 of the special link of one chain is located at or near the free end of the chain to engage the cam roller 130 of the switch 3LS after the bundle of bars is lowered, as shown in solid lines in FIGURE 3, and the cam portion 129 of the special link of the other chain 120 is located on an intermediate portion of the chain sling to engage the cam roller 130 of the switch 2LS when that chain is taut and the festoon of that chain is in its uppermost position or when it is near the position indicated in dot-dash lines in FIGURE 3. In effect, the switches 2LS and 3LS serve to limit the amount of rotation of the shaft 100 in either direction, and, therefore, they may be replaced by conventional rotary limit switches if desired.

Means are provided to prevent jamming and to provide a single row of bars $b$ on the storage ramp 68 including the guide plates 13 whose lower surfaces may be located parallel to the row of bars $b$ on the ramp as shown in FIGURE 5. Such means preferably includes plow plates 135 having triangular or plow-shaped end portions 136 projecting forwardly beyond the front vertical surface 134 of the plate 13. Each plate 135 has two elongated slots 137 which receive two cap screws 138 that are screwed into the plate 13. This arrangement permits adjustment of the position of the plow plate 135 in accordance with the size and/or shape of the bars $b$. As shown in FIGURE 5, the plate projects forwardly a substantial distance. When handling bars $b$ of smaller cross section, the screws 138 are loosened and the plate is retracted a short distance. If desired a curve or sloping surface 119 may be provided at the entrance side of the plate 13, but this is not essential.

In order to permit feeding of bars $b$ of different sizes and shapes, it is preferable to provide means for adjusting the plates 13 vertically. As herein shown, each plate 13 has two vertically elongated slots 139 which receive two pairs of cap screws 140 to hold the plate rigidly in its adjusted position. This permits raising of the plates 13 when larger bars $b$ are fed to the storage ramp and lowering the plates for smaller bars. The bars or tubes $b$ may be of round, square, hexagonal, L-shaped or T-shaped cross section.

Means are provided for reversing the motor 93 and lowering the chains 120 when the bars $b$ are crossed or jammed so that they do not move onto the feed ramp. Such means is responsive to a malfunction at the plate 134 indicated by upward movement of a bar $b$ above the plate 136 and/or pressure against the plate 13. As herein shown, switch means are provided for reversing the motor 93 in response to upward movement of the plate 13. A limit switch 10LS is mounted in a fixed vertical position directly below an extending beam portion 145 of the beam 10 by an angle bracket 142 which is mounted on the large plate 90 of the frame G. A vertical adjusting screw 144 is carried by the portion 145 and has a flat bottom head 145 for engaging the vertical actuator 143 of the limit switch. The switch is tripped when pressure of bars $b$ against the plates 13 moves such plates a small distance vertically (e.g., .03 to .15 inch). The cantilever arrangement of each beam 10 permits such vertical movement in response to jamming of the bars.

The electrical apparatus for the bar feeder A and the unscrambler B includes a number of limit switches 1LS through 10LS located at different points on the machine to permit automatic or semi-automatic operation. The limit switches for the feeder A may be similar to those used on the bar feeder disclosed in the aforesaid copending applications Ser. Nos. 600,350 and 633,868. As herein shown, the limit switch 8LS has a cam roller 71 and is tripped by a cam actuator 72 projecting from the shaft 47 of the bar feeder A. The limit switch 6LS has a similar cam roller 74 (FIGURE 5) which normally projects above the ramp 68 into the path of movement of the bars $b$ and engages a bar $b$ as it moves to a position at the end of the ramp to trip the switch 6LS.

The limit switches 4 and 5 are identical. Each has a body 133 which may be mounted in a fixed position on the frame F adjacent the bar 14 and has a swinging arm 132 which carries a cam roller 131 for engaging a portion of the pusher 39 or any other suitable portion of the conveyor, whereby each limit switch is tripped in response to movement of the conveyor chain beyond a predetermined point.

One or more emergency stop buttons 160 are preferably provided at different points around the machine to permit immediate stopping of the machine. As herein shown, one of such buttons is provided on the housing or cover 79 located on the frame F above the sprocket 23.

Figure 7:
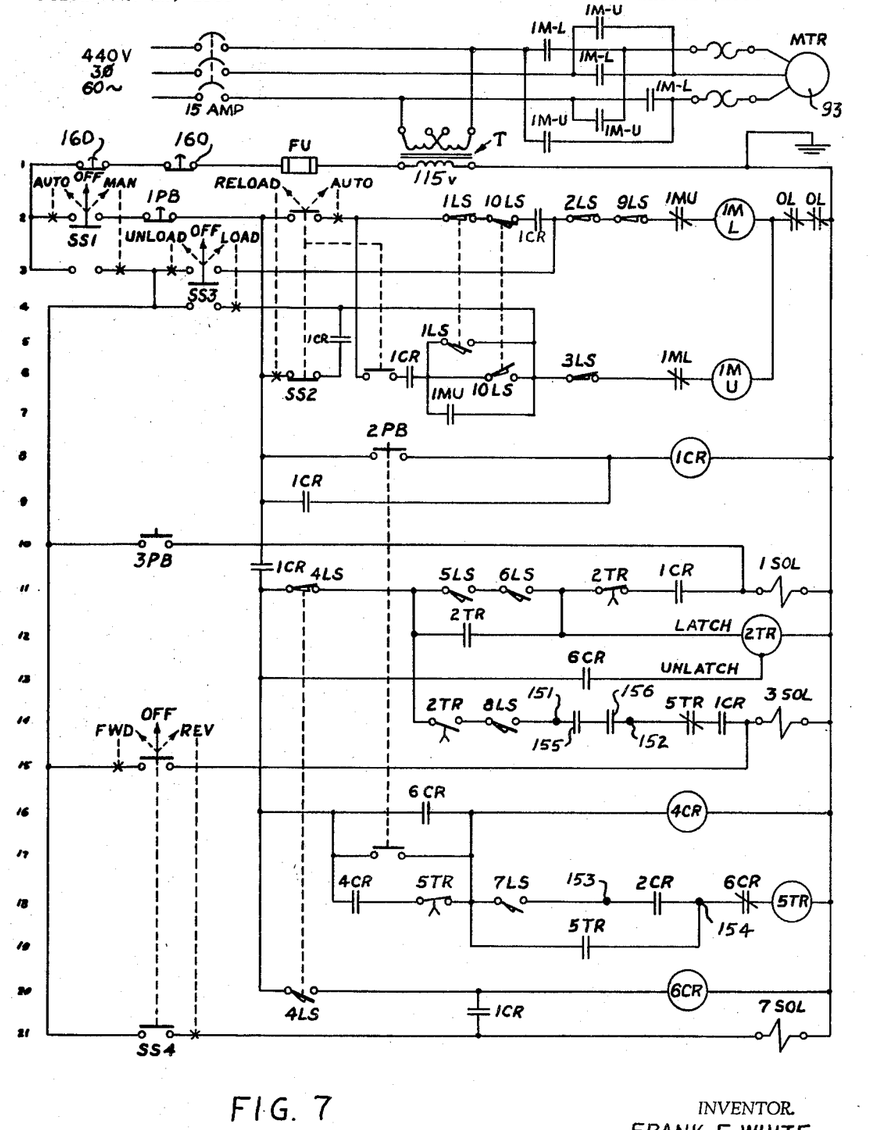
FIGURE 7 is a diagrammatic view showing the electrical control circuit.

Suitable electrical controls are provided to effect automatic operation of the feeder A and the unscrambler B. FIGURE 7 is a schematic electrical diagram illustrating a preferred type of electrical control for use with a machine of the type shown in FIGURES 1 to 6. In general the graphic symbols and basic device designations employed in FIGURE 7 are in accordance with the electrical standards of the Joint Industrial Council as set forth in the April and May 1967 issues of "Electro-Technology." Thus the lines of the control circuit diagram are numbered 1 through 21 at the left of FIGURE 7 and are referred to by these numbers in the description which follows.

The electrical controls are designed for use with a punch press D which receives bars $b$ from the bar feeder A. The electrical connections for the punch press (interlock) controls are in lines 14 and 18 and are identified as 151, 152, 153 and 154. The relay contacts 155 and 156 of the punch press interlocks in line 14 are open when the punch press die is open and empty. The relay 2CR contact is closed automatically at the beginning of one of the punch press cycles to provide for remnant ejection as disclosed in more detail hereinafter.

The sequence of operations is described below assuming that, at the outset, the punch press die is open and empty, the bar feeder A is empty, the pusher 39 is fully retracted (contacts 4LS and 5LS in line 9 are closed), the relay 2TR is unlatched, the escapement fingers are fully retracted, the festoon of each unscrambler chain 120 is fully lowered, and a bundle of bars $b$ are present on the supporting members 80.

In order to obtain automatic operation the three-position selector switch SS3 is moved to the "OFF" position, the three-position selector switch SS1 is moved from the "OFF" position to the "AUTO" position to close its contacts in line 1, and the two-position selector switch SS2 is also moved to the "AUTO" position to close its contacts in lines 2 and 6. Then the cycle-start push-button 2PB is depressed to close its contacts in lines 8 and 17 momentarily and to energize the main control relay 1CR in line 8, thereby closing the normally-open 1CR contacts in lines 2, 6, 9, 11 and the other 1CR contacts located between lines 4 and 6, lines 10 and 11, and lines 20 and 21. The main control relay 1CR is maintained energized by its closed relay contacts in line 9 after the pushbutton 2PB is released. Depressing said pushbutton also initiates operation of the bar feeder A as described in more detail hereinafter.

The 1MU relay contacts, the OL overload relay contacts, the 1PB pushbutton contacts and the limit switches 1LS, 2LS, 9LS and 10LS are normally closed in line 2 so that closing of the 1CR relay contacts energizes relay 1ML to effect closing of the 1ML relay contacts in the supply circuit. The electric motor 93 is then driven in a direction to raise the bundle of bars on the chains 120 and to discharge bars $b$ onto the storage ramp 68.

The first bar $b$ sliding down the ramp engages the actuator 77 of the limit switch 1LS (also 9LS) to open its normally-closed contacts in line 2 momentarily and simultaneously to close its contact in line 5, thereby deenergizing relay 1ML and energizing relay 1MU. At this time the limit switch 3LS and the 1CR and 1ML relay contacts are closed in line 6. The contacts of 1LS are again closed in line 2 but the 1MU relay contacts open to deenergize relay 1ML. In the supply circuit the 1ML relay contacts open and the 1MU contacts close as the relay 1MU is energized to reverse the electric motor 93 and lower the bundle of bars $b$ on the chains 120. In the machine shown herein, the motor 93 is of conventional construction with the usual brake 92 to hold the load in a given position as the motor is turned off or reversed.

The contacts of limit switch 1LS are closed only momentarily in line 5 if the storage ramp is not full, but the energization of the relay 1MU is maintained by closing of the 1MU contacts in line 7. The bundle therefore continues to be lowered by the motor 93 and the slings 120 until the bundle is fully lowered as shown in FIGURE 3 and the link actuator 129 engages the cam roller 130 of the limit switch 3LS to trip the switch. As the switch 3LS opens momentarily in line 6, the relay 1MU is deenergized and its normally-open contacts in line 7 and in the supply circuit open to stop the lowering of the slings 120 and to brake the motor 93. At this time the limit switch 2LS in line 2 is closed and the normally-closed contacts of the relay 1MU in line 2 close, but the relay 1ML will be energized only if the contacts of the limit switch 1LS are closed in line 2. If the storage ramp is full and such 1LS contacts and the corresponding 9LS contacts are open, the relay 1ML and the motor 93 will not be energized until some of the bars $b$ are taken from the ramp. As soon as such 1LS contacts and 9LS contacts close in line 2, the load cycle is repeated automatically.

Thus the slings 120 are repeatedly raised and lowered to orient the bars and to maintain a supply of bars $b$ on the storage ramp 68, the raising of the bundle being stopped whenever the ramp is full until there is a demand for more bars. When the supply of bars $b$ in the bundle is used up and there are no bars to actuate switch 1LS and deenergize the relay 1ML, the slings 120 continue to move upwardly until they reach their uppermost positions and the trip cam actuator 129 engages the cam roller 130 of the limit switch 2LS to open its contacts in line 2. This deenergizes relay 1ML and closes its contacts in line 6, but the 1LS contacts remain open in line 5 so that the relay 1MU is not energized. Therefore, the motor 93 stops, and it is necessary to reload before the loading cycle can be continued.

The two-position selector switch SS2 is then moved from the "AUTO" to the "RELOAD" position to open its contacts in line 2 and close its contacts in line 6, thereby energizing relay 1MU to effect lowering of the slings 120 by the motor 93. The limit switch 3 opens to deenergize the relay 1MU and stop the motor 93 when the slings are in their lowermost positions so that a bundle of bars $b$ can be placed on the lateral supports 80 above the festoons of the chains. There is no danger of energizing the relay 1ML and starting the loading cycle accidentally so long as the switch SS2 remains in the "RELOAD" position with its contacts open in line 2. After loading of a bundle is completed, the selector switch SS2 is returned to the "AUTO" position. The conveyor will continue feeding bars to the press while the unscrambler is being reloaded unless the stop button 1PB or 160 is depressed, in which case the load cycle is restarted by depressing the cycle start button 2PB.

The load cycle will be repeated and the slings will be raised and lowered under the control of the limit switches 1LS and 3LS to orient the bars of the bundle so long as there is a supply of bars remaining in the bundle and the bars continue to move onto the storage ramp 68. However, when the bars are disoriented and become entangled or jam up so that they cannot move under the plow points at 136 onto the storage ramp, the slings 120 will continue to raise the bundle and will force the bars against the front surfaces 134 of the plates 13 as they move toward their uppermost position. The resulting pressure against the plates 13 will cause them to deflect with the beams 8, 9 and 10 and thereby trip the limit switch 10LS to open its contacts in line 2 and to close its contacts in line 6 momentarily. It is manifest that the switch 10LS will therefore function like the limit switch 1LS to control the relays 1ML and 1MU and reverse the motor 93. The slings 120 will continue to be raised and lowered by the switch 10LS and the switch 3LS until the bars become oriented sufficiently to enter the storage ramp 68.

Surprisingly the raising and lowering of the bars is very effective in orienting the bars to prevent jamming, and the limit switch 10LS is not so important for bars which can readily be oriented. In such a case the limit switch 10LS might be omitted and the operator can manually perform the function of such limit switch if jamming should occur before the bars become oriented so that they will feed properly. However, where fully automatic operation is desired, it is usually essential to have the limit switch 10LS or other switch indicate improper feeding in response to a malfunction such as misalignment or jamming of the bars $b$, resistance to raising of the chains 120, or improper loading on the storage ramp.

Depressing the cycle start button 2PB momentarily not only initiates operation of the unscrambler B as described above but also initiates operation of the bar feeder A by closing its contacts in line 17 and energizing relay 4CR. Said relay is maintained by closing of its contacts in line 18 before the button 2PB returns to its normal open position, and the master control relay 1CR is similarly maintained by its contacts in line 9. Because the pusher 39 is fully retracted and bars $b$ have already been loaded onto the storage ramp, the normally-open limit switches 5LS and 6LS are closed in line 11. At this time the contacts of limit switch 4LS and relays 2TR and 1CR are also closed in line 11 so that solenoid 1SOL and latch relay 2TR are energized. Said solenoid admits air under pressure to the pneumatic cylinder 59. The shaft 47 is then turned in unison with the ramp bars 49 to lift one bar $b$ from the ramp and deliver it to a central position on the carriers 27 of the conveyor C. The normally-open 2TR contacts in line 12 close and the 2TR contacts in line 14 time closed while the 2TR contacts in line 11 time open to deenergize solenoid 1SOL after a half of a second or so and thereby effect retracting of the escapement bars 49 just before the normally-open 2TR contacts in line 14 are closed to advance the conveyor. When the bars 49 reach such retracted position the cam actuator 72 of shaft 47 engages the cam roller 71 to trip the limit switch 8LS and close the contacts in line 14.

As the punch press die of the machine D is open and empty, the relay contacts 155 and 156 of line 14 are closed, and the solenoid 3SOL is energized upon closing of the 2TR contacts of line 14 to admit air to the air motor 40. This causes the conveyor C and its pusher 39 to advance and feed one bar $b$ axially into the punch press D. The end of such bar contacts a limit switch in the punch press that initiates a cut and form operation and simultaneously opens relay contacts 155 and 156 of the punch press interlock to deenergize solenoid 3SOL and stop the movement of the conveyor C. At the end of each punch press cycle the contacts 155 and 156 close to energize the solenoid 3SOL again and cause further forward movement until the bar again contacts said limit switch of the punch press to open contacts 155 and 156. The bar $b$ is thus advanced in increments by the conveyor until only a minor portion of the bar remains.

When the total advance of the pusher 39 is greater than the original length of the bar $b$ and the remaining portion of the bar adjacent the punch press D comprises only one usuable piece plus a remnant, the advancing conveyor trips the limit switch 4LS to open its contacts in line 11 and deenergize solenoid 3SOL while closing its contacts in line 20 to energize relay 6CR and solenoid 7SOL. The 6CR contacts in line 13 then close to energize the unlatch circuit of latch timer relay 2TR. The solenoid 7SOL reverses the conveyor C and causes its air motor 40 to retract the chains 24 and the pusher 39 without retracting the remaining portion of the bar $b$ which is held in the press D.

As it approaches its retracted position, the pusher 39 engages the limit switch 4LS to close its contacts in line 11 and open its contacts in line 20, thereby deenergizing relay 6CR and solenoid 7SOL and stopping the air motor drive for the conveyor. The pusher continues to move rearwardly until it engages the normally-open limit switch 5LS at its fully retracted position to close the 5LS contacts in line 11 and energize solenoid 1SOL. The escapement cycle is then repeated as previously described to move one or more bar $b$ from the storage ramp 68 to a position on the carriers 27 of the conveyor wherein its front end is near and behind the rear end of the remaining portion of the previous bar fed to the punch press (which still contains one usable piece plus a remnant).

After the escapement arms 49 are retracted and the solenoid 3 is energized, the conveyor advances the new bar against said remaining portion of the previous bar and advances the latter portion against the limit switch of the punch press which opens contacts 155 and 156 to stop the conveyor and simultaneously starts the punch press cycle and closes relay 2CR contact in line 18 in anticipation of the remnant. The normally-open limit switch 7LS is actuated by the advancing conveyor and held closed while the last piece from said remaining portion of the bar is worked upon by the punch press so that, at the start of the punch press cycle, the closing of the 2CR contact energizes timer relay 5TR and closes its contact in line 19 while opening its contact in line 14, thereby preventing energization of the solenoid 3SOL.

When this particular punch press cycle is completed and the die is open, the relay contacts 155 and 156 close but the conveyor does not advance immediately because the 5TR relay contact is then open in line 14. The normally-closed 5TR contact in line 18 is timed to open one-half second or more after the completion of the punch press cycle so that the remnant can drop free before the conveyor again moves forward. When the latter contact opens in line 18, the relay 4CR and the time relay 5TR are deenergized and the normally-closed 5TR contact in line 14 closes to energize the solenoid 3SOL and advance the conveyor.

The operations of the bar feeder described above are repeated until the machine is shut off, as by pushing the stop button 1PB of line 2 or one of the two emergency stop buttons 160 of line 1.

To resume operation after a power interruption during any part of the cycle, it is usually sufficient to simply push the cycle start button 2PB to energize relays 1CR and 4CR. It is important that 4CR be energized after power failure if a remnant is soon to be ejected.

When it is desired to employ manual operation rather than automatic operation, the switch SS1 is moved from the "AUTO" to the "MAN" position to open its contact in line 2 and close its contact in line 3. The operations are then controlled manually by the switches SS3, SS1 and 3PB. The various 1CR relay contacts, such as those in lines 2 and 6 and between lines 4 and 6, prevent sneak circuits when using the manual controls.

With the switch SS1 set for manual operation, the solenoid 1SOL may be energized by depressing pushbutton 3PB, the chains 120 may be raised or lowered by moving the selector switch SS3 to the "LOAD" or "UNLOAD" position to energize either the relay 1ML or the relay 1MU, and the conveyor may be advanced or retracted by moving the three-position selector switch SS4 to the "FWD" or "REV" position to energize either the solenoid 3SOL or the solenoid 7SOL. The conveyor may be "jogged" to the desired position. The switches SS1, SS3 and SS4 may be of identical construction.

When operating manually it is usually preferable to have a few operative limit switches to protect the equipment. As herein shown, the switches 2LS, 3LS and 9LS are the only limit switches which are in operation during manual control of the unscrambler. The operation of the switches 2LS and 3LS has been described previously. The normally-closed limit switch 9LS may be essentially the same as the switch 1LS and located in the same place relative to its associated feed ramp 68. If the switch 1LS is located in an adjusted position on the feed ramp 68 below beam 10, the switch 9LS may be located at the same adjusted position relative to its slot 76 on the feed ramp 68 below beam 9 (and vice versa). The switch 9LS is preferably employed but is optional and may be omitted.

The electrical system of FIGURE 7 may be simplified for less expensive machines and it will be apparent that various electrical control systems may be used to perform the process of this invention. If more steps of the process are to be performed manually, the limit switches and other switches may obviously be associated with indicator lamps, horns or the like to signal the operator when a motor is to be operated or stopped. In the particular electrical system herein illustrated, a 300 volt-ampere control circuit transformer T and a 3-horsepower motor 93 are used, and a 5-amp fuse FU is provided to protect the 115-volt control circuit which may be grounded (line 1). A 440-volt, 3-phase, 60-cycle supply circuit is provided in connection with the usual circuit breakers or other circuit disconnecting means.

For initial operation, with the bar storage ramp 68 empty, it may be desirable to allow the storage ramp to fill before loading a bar on the conveyor. To accomplish this, the air supply to the air motor 40 can be shut off manually. Also it may be desirable, when feeding certain types of machines D, to stop the operation of the conveyor automatically when the supply of bars on the storage ramp 68 is exhausted. Means including a switch similar to the switch 6LS or special means on the machine D may be provided for this purpose.

Figure 8:
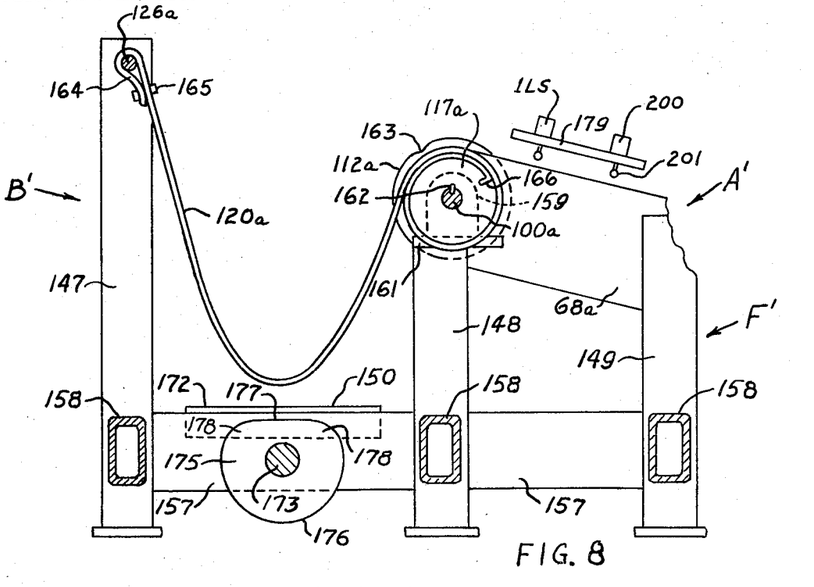
FIGURE 8 is a schematic transverse vertical sectional view on a reduced scale with parts omitted showing a modified form of apparatus constructed according to the invention.

It will be apparent that various designs of unscramblers and bar feeds may be used when practicing the present invention. FIGURE 8 is a schematic view illustrating one type of apparatus which could be employed. In this figure the bar feeder A' may be constructed like and function like the bar feeder A of FIGURES 1 to 6. The bar feeder B' may also be quite similar to the bar feeder B of FIGURES 1 to 6, and the automatic controls for the entire machine may be generally similar to those illustrated in FIGURE 7.

As herein shown the apparatus of FIGURE 8 has a rigid frame F' including tall vertical posts or standards nected by transverse beams 157. Longitudinal beams 158 147 and shorter posts 148 and 149 which are rigidly connected are welded to the posts 147, 148 and 149 and to similar posts along the length of the machine. A flat plate 161 is welded to the top of each post 148 and has a bearing support 159 mounted thereon to provide a rotatable mounting for a horizontal shaft 100a which may be similar to the shaft 100 and driven in a similar manner.

A flat feed ramp plate 68a is welded to each post 148 and each post 149 and functions like the storage ramp 68 described previously. As shown in FIGURE 8 the rollers 45 of the feed ramp are omtted so that the ramp would be used with bars b of rounded cross-section. Such omission is for convenience of illustration, it being understood that the rollers 45 may be provided on each ramp 68a as on the ramp 68. The rollers 45 may be mounted in the same way on each feed ramp or may be slightly out of alignment. Off-setting of the rollers minimizes bumping when rounded bars are placed on the feed ramp.

A sling support wheel is mounted on the longitudinal shaft 100 or 100a of the unscrambler B or B' so that the chain, belt or other sling used to support the bundle will move under such sling support as the bundle is elevated. Such sling support wheels are preferably driven by the shaft 100 or 100a rather than being freely rotatable so that it is not necessary to provide means for pulling the free end of the sling. There is no problem here where the sling support wheel consists of a sprocket and the sling is a chain. However, if a belt is used as the sling, it is usually preferable to attach one end of the belt to the drum or other sling support wheel and wrap the belt around the wheel as is done in the species of FIGURE 8.

It will be understood that the slings used in practicing the present invention may be chains, cables, belt, straps or the like. Because the bundle feeder and unscrambler often must be constructed to handle bundles with a length of more than 20 feet and a weight of more than 5 tons, it is often preferable to employ heavy chains or metal mesh slings. It will be understood that the chains 120 of the bundle unscrambler B may be replaced by metal mesh slings, such as the slings 120a of FIGURE 8. Such metal mesh slings are often preferred because they are less apt to damage the bars b.

Figure 10:
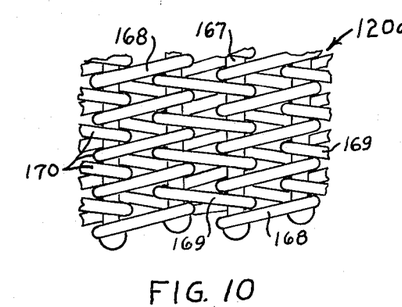
FIGURE 10 is a fragmentary top view of a portion of the woven wire mesh sling used in the unscrambler of FIGURE 8.

A portion of a suitable metal mesh sling is shown in FIGURE 10. Slings of this type are made by Cambridge Wire Cloth Company of Cambridge, Md., and are commonly used for hoisting heavy metal bundles. These slings may be made from Monel metal to provide corrosion resistance and, if desired, may be covered with polyurethane or neoprene to permit use with soft metal bars. A typical metal mesh sling is formed of 10- or 12-gauge wire fabric and has a width of 4 to 6 inches. Such slings are conventional and, as shown in FIGURE 10, comprise long hinge pins 167 which interconnect the flattened generally helical sections 168 and 169 of the sling. Each helical section has a number of individual loop portions 170 which fit together to provide the usual woven wire construction. Each sling 120a for example may be of the heavy-duty type having a width of 6 inches and a capacity of 3 to 5 tons.

As shown in FIGURE 8 the sling 120a has a looped end portion 164 which extends around a long longitudinal rod 126a and is fastened to the adjacent portion of the sling by a clamping bolt 165. The off-set end 166 of each sling is clamped or otherwise rigidly connected to its associated sling support wheel 117a so that it turns in unison with the wheel and the shaft 100a. Thus each sling 120a is wrapped around its wheel 117a as the bundle is raised. If this arrangement is used in the machine B, it will be apparent that the limit switches 2LS and 3LS should be moved or replaced by a conventional rotary limit switch.

The arrangement shown in FIGURE 8 permits axial adjustment of the position of each sling support wheel 117a and simultaneous adjustment of the position of the loop portion 164 of each sling which readily slides on the rod 126a to any desired position. The optional wheels 112 or 112a may similarly be adjusted axially on the shaft 100 or 100a to any desired position. Any suitable means may be provided to permit the axial adjustment and to clamp or hold the wheels in the desired positions. For example, the shaft 100 or 100a may be provided with a keyway and a key 162 which fits the wheel 117a. The axial adjustment of the sling support wheels 117 or 117a is desirable when the length of the bars b is changed so that the center of gravity of the bars may be maintained half way between the two slings 120 or 120a. Two slings are usually sufficient to support the weight of the bundle, and such number is preferred when three wheels 112 or 112a are provided to assist in straightening the bars.

The wheels 112a may be constructed and arranged like the wheel 112 shown in FIGURE 6 with a circular peripheral surface 116 and may have a diameter equal to or only slightly greater than the wheel 117a. However, the diameter of the wheel 112 or 112a should be sufficient to insure contact of all three of such wheels with a bar b as the bar moves over the two sling support wheels 117 or 117a. When handling bent bars it is sometimes desirable to increase the diameter of the wheel 112 or 112a. For example, such diameter may be 5 to 25 percent greater than that of the wheel 117 or 117a. If desired the peripheral surface of the wheel 112a may be provided with one or more rounded notches or projections to assist in separating one bar b from the adjacent bars. The wheel may be provided with one or more shallow rounded recesses 163 for this purpose. Such wheel is rigidly clamped in its adjusted position on the shaft 110a for rotation with the shaft and, therefore, may be of non-circular shape. However, each wheel is preferably generally circular when feeding the bars under overhanging guide means such as the plates 13 or the plow points 136.

Various means may be provided for carrying the bundle of bars to the unscrambler B or B'. The frame G has the two posts 82a and 83a spaced apart at least 5 feet and is arranged to receive the forks of a conventional lift truck so that the bundle can be elevated above the frame G and lowered onto the chains 120 and the supports 80 by lowering said forks between said two posts.

Figure 9:
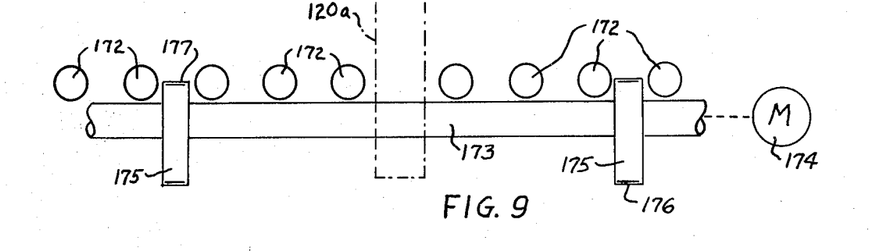
FIGURE 9 is a schematic longitudinal elevational view of the equipment shown in FIGURE 8 on the same scale, the lowered position of the sling being shown in dot-dash lines.

The bundle may also be delivered lengthwise to the unscrambler B or B' by a suitable roller conveyor. As shown in FIGURES 8 and 9, a conventional power roller conveyor 150 is provided between two of the beams 158. The closely spaced rollers 172 of the conveyor may be rotated in unison by conventional drive means (not shown). The rollers of the conveyor may be spaced apart so as to permit the lowering of chains, straps, belts or other slings between the rollers so that the slings are below the bundle as it is moved axially over the rollers 172.

In performing the process of this invention and when lowering the slings 120a to perform the unscrambling operation, the slings may be lowered to transfer all or a major portion of the bundle weight to the rollers 172 while such rollers are stationary. The festoon of the sling 120a shown in solid lines in FIGURE 8 may thus be lowered between the rollers 172 as shown in FIGURE 9.

Unscrambling may be effected by raising and lowering the slings a substantial distance without engaging the rollers 172 or any other supporting members (such as 80), but the bundle should be lowered a distance greater than half the initial diameter of the bundle and preferably at least about one foot. Such distance is preferably at least equal to the initial bundle diameter and is usually between 20 inches and 60 inches. The speed of movement of the slings during the unscrambling operation may vary considerably, but the time required to lower and raise the bundle 20 to 50 inches is usually in the neighborhood of 10 to 20 seconds.

Figure 11:
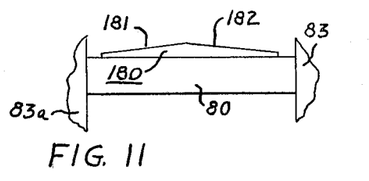
FIGURE 11 is a fragmentary elevational view showing a modification of the unscrambler of FIGURES 1 to 6.

More effective unscrambling can be obtained by lowering the bundle against fixed supports such as the members 80 (FIGURE 3) or the conveyor 150 (FIGURE 8) to transfer most of the weight from the slings to such supports. Where the upper surfaces of such supports are flat like those of the members 80, some of the bars in the bundle move outwardly as the bundle engages the flat surface so as to assist in orienting the bars and bringing them into parallel relation. This results from changing the shape of the bottom of the bundle from the curved shape it assumes when carried by the slings to a flat shape (see FIGURE 3). The outward movement of the bars during orientation may be assisted by providing the upper surface of the support 80 or other support with a special shape, such as a convex shape as illustrated in FIGURES 8 and 9 and also in FIGURE 11, or by moving portions of the support while in contact with the bundle as is optional in the species of FIGURES 8 and 9. Thus the shape of each member 80 may be adjusted by covering its upper surface with plates of different shape, such as the plate 180 shown in FIGURE 11 which may be detachably connected to the member 80 or rigidly connected by welding. As herein shown, the plate 180 has flat upper surfaces 181 and 182 inclined in opposite directions to cause outward movement of bars in the bundle toward the posts 83 and 83a during the unscrambling operation.

FIGURES 8 and 9 illustrate another optional form of unscrambling apparatus which includes a long longitudinal shaft 173 rotatably supported by the beams 157 of the frame F' and driven by a suitable motor 174, which may be a reversible electric motor. Two or more eccentric bar-engaging members 175 are rigidly mounted on the shaft 173 to rotate therewith. These are located between pairs of rollers 172 (if such rollers are used) and are shaped so as to be below the upper surfaces of the rollers 172 during initial loading of the bundle onto the slings. After such loading, they may be turned 180 degrees to cause the circular peripheral surface 176 to project above the rollers for engagement with the bundle during the unscrambling cycle.

As herein shown, each cam member 175 has a flat peripheral surface 177 and rounded shoulder surfaces 178 tangent to the surfaces 176 and 177 so that the member 75 can be oscillated or rotated by the motor 174 while it engages the bundle to assist in orienting the bars. Thus, when performing the process of this invention, during each unscrambling cycle, the bundle may be lowered by the two slings 120a into engagement with the surface 176 while the surface 177 is in a horizontal position below the shaft 173 and the shaft 173 may then be rotated one or more times to agitate the bundle before it is lifted again. Also the bundle could be lowered onto the rollers 172 or other horizontal support and then agitated by turning the shaft one-half revolution in one direction and then a full revolution in the opposite direction to move one shoulder portion 178 against the bundle toward the post 147 and then move the other shoulder portion 178 against the bundle toward the post 148.

The bar feeder A' and the unscrambler B' of FIGURE 8 may be controlled electrically using equipment of the type shown in FIGURE 7 including the limit switch 1LS which may be mounted in various adjusted positions on the rigid supporting member 179 for engaging the first bar moving down the ramp to initiate the unscrambling cycle and the lowering of the bundle each time a few bars are fed onto the ramp. This may be called the upper bank control. A lower bank control may also be provided such as a limit switch 200 having a cam actuator 201. The switch 200 may be identical in construction to the switch 1LS and may be placed in an adjusted position on the support 179 to signal when the number of bars remaining on the ramp is below the desired number. At this time the slings 120a may be elevated by a manual or automatic control to resume feeding of bars to the storage ramp 68a.

The unscrambler of this invention is suitable for use with various types of bar feeders and is effective when handling relatively large bundles containing 100 or more bars with lengths sometimes in excess of 20 feet. An unscrambler of the type shown herein can effectively handle bundles with weights in excess of 5 tons and sometimes in excess of 10 tons.

In order to obtain effective unscrambling of the bars, the slings 120 or 120a should be supported so as to be spaced apart a distance substantially greater than the initial width or diameter of the bundle before its holding straps are removed or cut off. The sling support wheels 117 or 117a are driven about an axis rotation spaced from the axis of the supports 126 or 126a a horizontal distance which is about 1½ to 2½ times the initial diameter of the bundle. The straight-line distance from the axis of shaft 100 or 100a to the axis of the support 126 or 126a should be 2 to 4 times the distance between the height of the latter axis and the maximum height of the wheel 117 or 117a.

It will be understood that, in accordance with the provisions of the patent statutes, variations and modifications of the specific methods and devices disclosed herein may be made without departing from the spirit of the present invention.

I claim:
1. A process for feeding hollow or solid bars to a bar storage ramp of a bar feeder having intermittently operated conveying means to receive bars fed individually from said ramp in a direction perpendicular to the direction of feed of the conveying means, said process comprising supporting a bundle of said bars on spaced slings with the bars substantially parallel to said last-named direction of feed, causing said slings to move over sling supports located near the entrance side of the storage ramp while supporting the ends of the slings remote from said storage ramp at an elevation greater than that of said sling supports to provide festoons extending under the bundle to support the same, raising the bars and simultaneously shortening the festoons by moving the slings up over said sling supports and down on the side of said supports nearest to said conveying means to cause some of the bars to move upwardly to a position near the top of said sling supports and to cause at least one bar to move laterally over the sling supports toward said conveying means to a position on said feed ramp parallel to said direction of feed, reversing the direction of movement of the slings over said sling supports to lengthen the festoons after a small number of said bars moves laterally onto said ramp so as to lower the bars and assist in orienting the bundle, thereafter raising the bundle as before to cause a small number of additional bars to move onto said ramp, and continuing to raise and lower the bundle until the ramp contains a series of bars of the desired number.

2. A process as defined in claim 1 wherein the bundle is lowered each time a few bars are fed by the slings to said feed ramp.

3. A process as defined in claim 1 wherein the bundle is repeatedly raised and lowered until the bars therein are oriented to feed properly to said feed ramp.

4. A process as defined in claim 1 wherein the bundle is raised and lowered onto a transverse supporting member (80) during each cycle of operations to cause outward orienting movement of the bars in the bundle.

5. A process as defined in claim 4 wherein said supporting member (80) is stationary and has an upper surface of a predetermined shape for engaging and supporting the bars in the bundle.

6. A process as defined in claim 4 wherein relative movement is provided between said supporting member and said slings during orienting of the bars while the bars are in contact with said supporting member.

7. A process as defined in claim 4 wherein said bundle is lowered by said slings when the bars do not feed properly to said feed ramp.

8. A process as defined in claim 1 wherein means are provided for indicating when a bar passes a predetermined portion of the feed ramp and wherein said slings and said bundle are lowered each time this event occurs to orient the bundle.

9. A process as defined in claim 1 wherein a guide plate (13) is mounted a short distance above the storage ramp and spaced therefrom to permit only a single row of bars on the ramp and to permit only one bar to pass onto the feed ramp at a time and wherein the slings are lowered when the bars apply pressure to said guide plate because of improper feeding.

10. A process as defined in claim 1 wherein said ends of the slings remote from said conveyor are supported at fixed positions and said sling supports are driven about an axis of rotation spaced from said fixed positions a horizontal distance about 1½ to 2½ times the initial diameter of said bundle.

11. Apparatus for unscrambling a bundle of disoriented bars comprising a rigid frame (G) having portions spaced apart to receive said bundle and to permit vertical movement thereof, spaced flexible slings (120) for supporting the bundle, means (124) on said frame for supporting the ends of the slings at spaced elevated positions at one side of the frame, sling supports (100, 117) mounted on the opposite side of the frame for supporting the slings to provide festoons for supporting the bundle of bars, a ramp (68) adjacent said sling supports, driving means (93, 94) for moving each sling upwardly from its festoon over its associated sling support (117) to shorten and raise said festoon and to feed a bar from said bundle to said ramp, said driving means being operable to effect raising of the bundle and also being operable to move each sling in the opposite direction to lower the bundle, means (1LS) responsive to movement of a bar to a position near said sling support during raising of the bundle and said slings for automatically reversing said driving means to lower the bundle, and means (3LS) responsive to lowering of the sling for automatically reversing said driving means to raise the bundle.

12. Apparatus as defined in claim 11 wherein the first means for reversing said driving means comprises a switch means (1LS) mounted in the path of movement of a bar on said ramp (68) and located near the entrance portion of the ramp.

13. Apparatus as defined in claim 11 wherein guide means (13) are provided above said ramp to cause formation of a single row of bars on the ramp and to prevent more than one bar from entering the ramp at a time.

14. Apparatus as defined in claim 13 wherein said guide means comprises a plurality of plow points (136).

15. Apparatus as defined in claim 14 wherein means (10LS) are provided for reversing said driving means in response to movement of the bars above said plow points.

16. Apparatus as defined in claim 13 wherein means (10LS) responsive to movement of said guide means (13) causes lowering and raising of the slings to unscramble the bundle.

17. Apparatus as defined in claim 11 wherein said sling supports comprise generally circular members (117) rigidly mounted on a shaft (100), and wherein a plurality of wheels (112) are mounted on said shaft for engaging a bar moving over said circular members at spaced points along its length to straighten the bar.

18. Apparatus as defined in claim 11 wherein a transverse supporting member (80) is carried by said frame (G) and engages the bundle to support the same and cause outward orienting movement of the bars when the slings (120) are lowered by said driving means (93, 94).

19. Apparatus as defined in claim 11 wherein said ramp has a row of supporting rollers (45) for carrying bar stock of non-circular cross section, and the first means for reversing said driving means includes switch means (1LS) having an actuator (77) mounted at the entrance portion of the ramp in the path of movement of the bar moving onto the ramp.

20. Apparatus as defined in claim 11 wherein said sling supports comprise generally circular rotatable members (117) mounted on a shaft (100) for rotation about an axis which is spaced from the supporting means (126) for the ends of the slings a distance which is about 2 to about 4 times the difference between the height of said supporting means (126) and the maximum height of said rotatable members.

21. Apparatus as defined in claim 20 wherein a transverse supporting member (80) is carried by the frame and has an upper surface with a height less than said maximum height which engages the bundle each time it is lowered, the difference in the latter heights being at least half the horizontal distance from said axis (at 100) to said supporting means (126).

References Cited

UNITED STATES PATENTS 3,308,968   3/1967   Harrington.

FOREIGN PATENTS 1,348,597   12/1963   France.

ROBERT G. SHERIDAN, Primary Examiner
F. E. WERNER, Assistant Examiner

U.S. Cl. X.R.
214—17, 152